(12) United States Patent
McDermott et al.

(10) Patent No.: US 6,940,811 B2
(45) Date of Patent: Sep. 6, 2005

(54) REDUNDANT INFORMATION PROCESSING SYSTEM

(75) Inventors: Scott A. McDermott, Herndon, VA (US); Kinji Mori, c/o Tokyo Institute of Technology, 2-12-1 Ookayama, Meguro-Ku, Tokyo (JP); Hiroyuki Yashiro, Chiyoda-Ku (JP)

(73) Assignees: Ihi Aerospace Co., Ltd., Tokyo (JP); Kinji Mori, Tokyo (JP); Aeroastro Inc., Herndon, VA (US)

( * ) Notice: Subject to any disclaimer, the term of this patent is extended or adjusted under 35 U.S.C. 154(b) by 826 days.

(21) Appl. No.: 09/836,229

(22) Filed: Apr. 18, 2001

(65) Prior Publication Data

US 2002/0027878 A1 Mar. 7, 2002

(30) Foreign Application Priority Data

Apr. 19, 2000 (JP) .................................... 2000-118083

(51) Int. Cl.[7] ............................. H04J 1/16; H04L 12/56
(52) U.S. Cl. ...................... 370/229; 370/235; 370/416; 370/455
(58) Field of Search ................................. 370/230, 252, 370/282, 360, 373, 377, 384, 235, 416, 455, 229; 709/208, 209, 211

(56) References Cited

U.S. PATENT DOCUMENTS 6,754,846 B2 * 6/2004 Rasmussen et al. .......... 714/11

FOREIGN PATENT DOCUMENTS

JP          A 9-134208          5/1997

JP          09134208          * 7/2005

* cited by examiner

Primary Examiner—Afsar Qureshi
Assistant Examiner—Christopher Grey
(74) Attorney, Agent, or Firm—Oliff & Berridge, PLC (57) ABSTRACT

A redundant information processing system with sufficient reliability is provided at a moderate cost without any part that could be a single fault point in the system. In the redundant information processing system in which an actuator 5 is controlled based on a signal from a sensor 4, each of processing devices 1A to 1C collects command signals from other processing devices and determines which command signal to be valid according to a logical decision, for example, a majority decision. When the command signals of more than two of the processing devices including the relevant processing device which determines are valid, the command signals are output according to priority while a control information blocking signal is output to a processing device other than those which are valid. When command signals of processing devices other than one which determines is valid, a processor part 2 does not output a command transmitting signal and does not either output the control information blocking signal to the other devices. When the number of control information blocking signals input from the other devices is less than two and the processor part outputs command transmitting signal, an interface part 3 outputs the command signal to the actuator 5. When the number of control information blocking signals input is two, the interface part 3 does not output the command transmitting signal even if the processor part outputs that command transmitting signal.

7 Claims, 9 Drawing Sheets

REDUNDANT INFORMATION PROCESSING SYSTEM

BACKGROUND OF THE INVENTION (i). Field of the Invention

The present invention relates to a redundant information processing system, especially to a redundancy information processing system which comprises three or more processing devices for constituting a redundant system (multiple system) to ensure reliability and in which the processing devices generate control information by performing predetermined information processing based on signals from common signal output means, and control a common object of control with the control information which is determined out of the generated control information by logical decision, for example, majority decision.

(ii). Description of the Related Art

As this kind of information processing system, there is one disclosed, for example, in Japanese Patent Application Laid Open No. 9-134208. This information processing system comprises three controllers as processing devices for independently processing information on their own clock based upon signals from a sensor as common signal output means, and an actuator device with an actuator that is the common object of control in which a combination of a majority decision logic circuit and a control circuit therefore is included.

In this information processing system, the thee controllers perform information processing based on signals from the sensor to generate an actuator control signal. The result of information processing by the controlled is collected and compared in each controller. The results of the comparison in each controller are sent to a storage element of the control circuit in the actuator device. The control circuit decides a normal controller by majority according to comparison result information from each controller. Then, the majority decision logic circuit is activated to selectively transmit an actuator control signal from the normal controller to the actuator. The actuator is thereby operated.

In such conventional information processing systems, however, the control circuit for majority decision and the majority decision logic circuit for selectively allowing the actuator control signals to pass based on the majority decision, which are in the actuator device, are parts each being a single fault point which keeps the actuator from operating when getting into trouble thereof. It has been therefore difficult to ensure sufficient reliability even with the controller part multiplied.

To solve this problem, when the majority decision logic circuit and the control circuit that could become the single fault point are composed of customized parts with higher reliability than that of the parts on the market, the system would cost significantly high. This is especially a crucial point when operation of many actuators needs to be controlled.

SUMMARY OF THE INVENTION

An object of the present invention is to provide a redundant information processing system which has sufficient reliability without any part that could be a single fault point.

To attain this and other objects, the present invention provides a redundant information processing system in which he or more processing devices perform predetermined information processing based on a signal from common signal output means and generate control information, and out of the control information, control information is decided by a logical decision to control a common object of control. Each of the three or more processing devices comprises a transmission permitting part which is adapted to collect the results of information processing in the process of generating the control information by the three or more processing devices, and to decide by the logical decision that the control information generated by which processing device is valid; in the case where control information generated by the two or more processing devices including the relevant processing device among the three or more processing devices are made valid, the transmission permitting part being adapted to output control information transmitting signal when the valid processing device has the highest priority among the processing devices with the valid control information according to predetermined priorities or not to output the control information transmitting signal when the valid processing device does not have the highest priority, while outputting a control information blocking signal to the processing devices other than the processing devices with valid control information; and in the case where the control information generated by the other processing devices except the above relevant processing device among the three or more processing devices is made valid, the transmission permitting part being adapted not to output the control information transmitting signal and not to output the control information blocking signal to the other processing devices.

In the information processing system, each of the three or more processing devices comprises a transmission permitting part. The transmission permitting part of each processing device collects the results of information processing in the process of generating the control information by the three or more processing devices that compose the system, and decides which control information generated by the processing devices to be valid according to the logical decision; in the case where control information generated by more than two of tee processing devices including the relevant processing device among the tree or more processing devices is made valid, the transmission permitting part outputs a control information transmitting signal when the valid processing device has the highest priority among the processing devices with the valid control information according to predetermined priorities or does not output the control information transmitting signal when the valid processing device does not have the highest priority while outputting a control information blocking signal to the processing devices other than the processing devices with valid control information; and in the case where the control information generated by the other processing devices except the above relevant processing device among the three or more processing devices is made valid, the transmission permitting part does not output the control information transmitting signal and does not output the control information blocking signal to the other processing devices. Note that generated control information or such as computing results in the process of generating the control information can be used for the results of information processing.

Furthermore, in the redundant information processing system according to the present invention, each of the three or more processing devices comprises a logical computing part which is adapted to input the control information blocking signal from the other processing devices except the above relevant processing device among three or more processing devices; and in the case where the number of inputs of the control information blocking signal is less than a predetermined number made valid by the logical decision and the transmission permitting part of the processing device outputs the control information transmitting signal, the logical computing part being adapted to output the control information generated by the processing device to the object of control, and in the case where the number of inputs of the control information blocking signal is more than the predetermined number, the logical computing part being adapted not to output control information generated by the processing device to the object of control even if the transmission permitting part of the processing device outputs the control information transmitting signal.

In the redundant information processing system, each of the three or more processing devices that compose the system comprises a transmission permitting part and a logical computing part. The logical computing part of each processing device inputs the control information blocking signal from the other processing devices except the above relevant processing device among the three or more processing devices that compose the system; and in the case where the number of inputs of the control information blocking signal is less than a predetermined number made valid by the logical decision and the transmission permitting part of the processing device outputs the control information transmitting signal, the logical computing part outputs the control information generated by the processing device to the object of control such as an actuator, and in the case where the number of inputs of the control information blocking signal is more than the predetermined number, the logical computing part does not output control information generated by the processing device to the object of control such as an actuator even if the transmission permitting part of the processing device outputs the control information transmitting signal.

According to the information processing system of the present invention, even though there is abnormality in the result of the information processing in several, which is below the majority, of the three or more processing devices that comprise the system, control information generated by the two or more processing devices is made valid according to the logical decision, for example, the majority decision. This makes it possible to select the control information that has been generated normally and to obtain the control information with higher reliability.

Furthermore, in the information processing device of the present invention, while the processing device with the higher priority of the two or more processing devices with valid control information outputs a control information transmitting signal, the processing device not with the higher priority of the two or more processing devices with valid control information does not output the control information transmitting signal. Moreover, the two or more processing devices that make the control information valid each output the control information blocking signal to the other processing devices, and so even if the transmission permitting part of the processing devices other than the processing devices with valid control information outputs the control information because of malfunction, the logic circuit part of the processing device inputs the control information blocking signal from beyond the predetermined number of the other processing devices that has been made valid according to the logical decision so as not to output the control information. Furthermore, even if the transmission pitting part of the plural processing devices other than the processing devices with the valid control information outputs the control information because of malfunction, the logical computing part of the processing devices with the highest priority outputs the control information to the object of control since the transmission permitting part of the of the processing device has output the control information transmitting signal, in the case where the number of inputs of the control blocking signals is less tan the predetermined number that is made valid according to the logical decision.

According to the information processing system of the invention, it is possible to output the control information from only a single processing device with the higher priority of the two or more processing devices that make the control information valid or that are more probable to function normally to the object of control.

Moreover, according to the information processing system of the invention, the information processing for generating the control information based on the signal from the common signal output means; logical decision processing for making the control information valid; selecting processing of control information from a plurality of processing devices made valid by the logical decision; all are performed in a plurality of processing devices. This frees from parts that could become a single fault point such as the majority decision logic circuit and its control circuit in the system. It is thereby possible to constitute a system with sufficient reliability at a moderate cost.

Furthermore, according to the information processing system of the invention, the above described processing can be performed regardless of the number of the processing devices as long as three or more devices arm provided. This provides high extendibility so that the number of processing devices can be increased or decreased in accordance with the demand for reliance whereby the demand can easily be met.

Still further, according to the information processing system of the invention, the logical computing part can be constituted by a combination circuit without feedback loop, and comprised of logical computing elements. This configuration, since the logical computing part does not have a storage element, can eliminate the possibility of a Single Event Upset (SEU) where the storage element is inverted by the influence of cosmic radiation or the like as to the logical computing part, when applied to the attitude control of a rocket or an artificial satellite in space. It is thereby possible to effectively prevent the result determined by the transmission permitting part according to the majority decision from being in vain because of the malfunction of the logical computing part caused by the SEU.

Further yet, according to the information processing system of the invention, in the case where the processing device uses past control information in the process of generating the control information, the processing device other than the processing devices that make the control information valid can rewrite the generated control information to the control information of the processing device that make the control information valid and use the rewritten control information for the next process of generating the control information. This configuration, when the transmission permitting part temporarily malfunctions because of the SEU, can abandon the incorrect processing result at the time of malfunction and use the control information generated in other normal processing device, thereby resulting in the improvement of the reliability of the system.

Further yet, according to the information processing system of the invention, the processing procedures of the logical decision made by the transmission permitting parts of the three or more processing devices can be the same. This configuration can reduce the operational errors made by the operator when developing programs for performing the logical decision or installing the programs in the system, thereby resulting in the improvement of the reliability of the system.

Other objects and advantages of the present invention will become more apparent from the following detailed description taken in conjunction with the appended claims.

DETAILED DESCRIPTION OF THE PREFERRED EMBODIMENT

Figure 1:
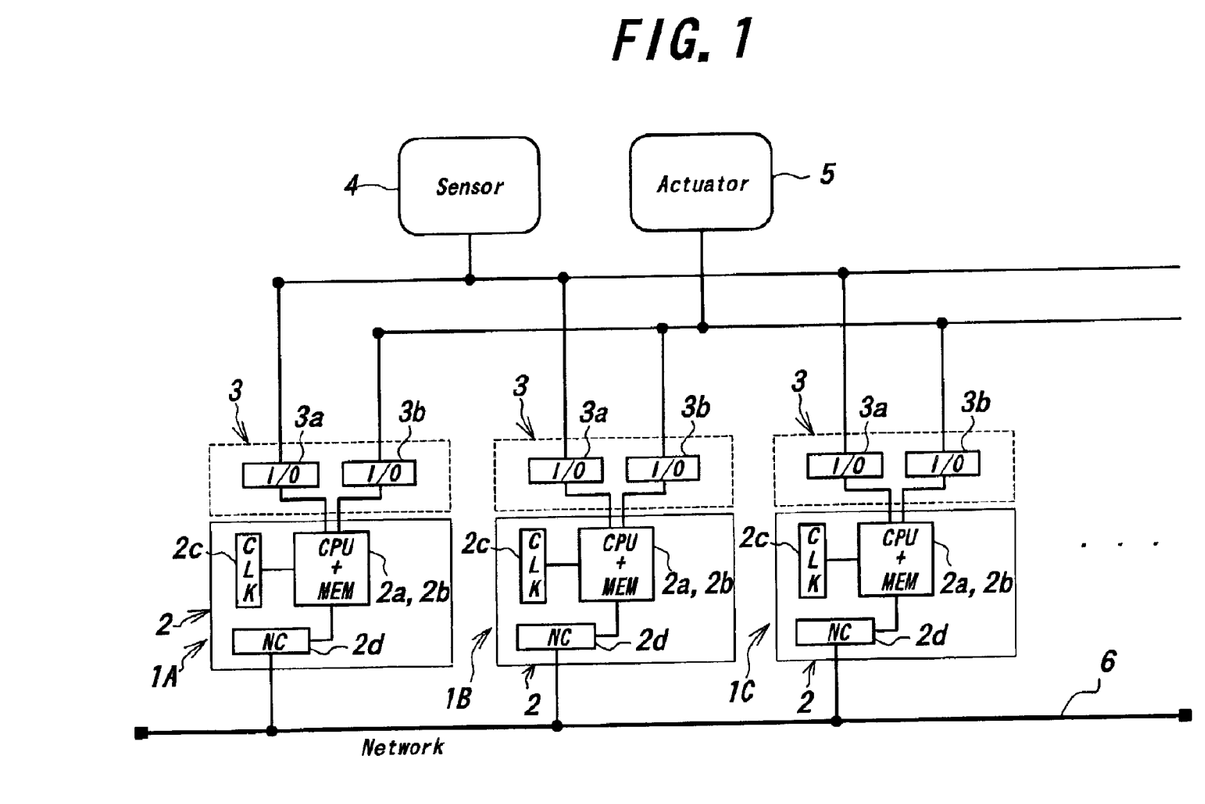
FIG. 1 is a structural view showing the configuration of one embodiment of the redundant information processing system according to the present invention.

An embodiment of the present invention will hereinafter be described in detail with reference to the accompanying drawings:

FIG. 1 is a structural view showing one embodiment of the redundant information processing system according to the present invention; reference numbers 1A to 1C denote processing devices all comprising the same configuration, 2 processor parts as transmission patting parts, 3 interface parts as logical computing parts, 4 a sensor as signal output means common to the processing devices 1A to 1C, 5 an actuator as a common control object for the processing devices 1A to 1C, and 6 a network which interconnects the processing devices 1A to 1C. The redundant information processing system according to this embodiment can be applied, for example, to the attitude control system of a rocket.

The processing devices 1A to 1C here comprise, more specifically, processor parts 2 and interface parts 3 respectively. The processor parts 2 comprise central processing units (CPU) 2a for computing processing, memories (MEM) 2b for storing information of programs or computing results and having the CPU execute computing processing based on a predetermined program, clock circuits (CLK) 2c for supplying a clock signal with the CPUs 2a and memories 2b, and network controllers (NC) 2d for controlling the exchange of information between the CPUs 2a and the memories 2b and a network 6. Note that each of the clock circuits 2c of the processor parts 2 in the three processing devices 1A to 1C in the system according to this embodiment operates independently.

Furthermore, the interface parts 3 comprise interface circuits (I/O) 3a connected to the sensor 4 for inputting an output signal from the sensor 4, interface circuits (I/O) 3b connected to the actuator 5 for outputting a command signal described later as control information to the actuator 5.

Figure 2:
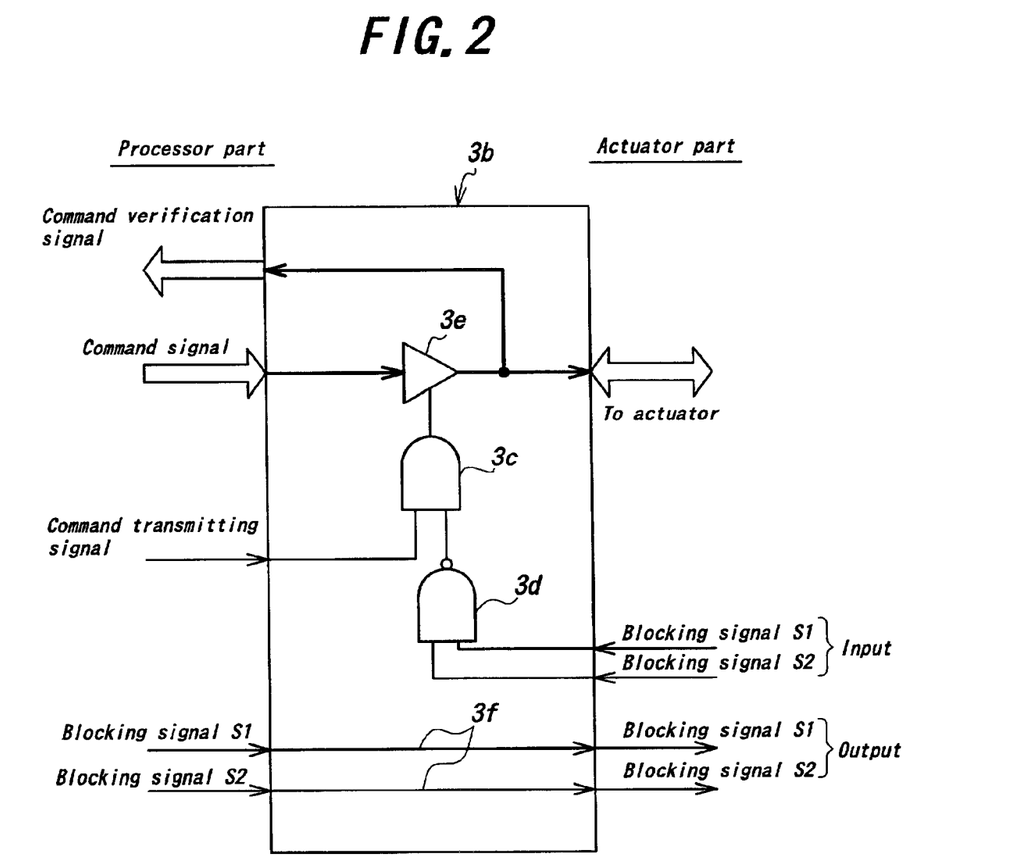
FIG. 2 is a structural view showing the circuitry of interface circuits of each processing device in the redundant information processing system in the embodiment.

FIG. 2 is a structural view showing the circuitry of the interface circuits 3b of each of the processing devices 1A to 1C. The interface circuits 3b here comprise a logic circuit for controlling the output of the command signal, which composes, as logical computing elements, an AND element 3c, a NAND element 3d and a gate element 3e, and a signal circuits 3f for directly outputting blocking signals S1, S2 described later as control blocking signals output by the processor parts 2 of the processing devices that have the interface circuits 3b to the interface circuits 3b of the other two processing devices.

In the above logic circuit, the NAND element 3d outputs a signal "0" when signals "1" as blocking signals S1, S2 are input at the same time from the interface circuits 3b of the two other processing devices, and outputs a signal "1" when a signal "1" is not input from at least one of the processing devices. Moreover, the AND element 3c outputs a signal "1" when a signal "1" is input from the NAND element 3d at the same time as a signal "1" as a command transmitting signal, which is described later as a control information transmitting signal from the processor parts 2 of the processing devices, is input. When at least either of a signal "1" as command transmitting signal or a signal "1" from the NAND element 3d is not input, the AND element 3c outputs a signal "1". When a signal "1" is input from the AND element 3c, the gate element 3e outputs a command signal to the actuator 5 when the command signal is input from the processor parts 2 of the processing devices. The gate element 3e further outputs the command signal as a command verification signal for command verification algorithm, which is described later, to the processor parts 2 of the processing devices 2, but when a signal "1" is not input from the AND element 3c, does not output to the actuator 5 and blocks the command signal even if the command signal is input from the processor parts 2 of the processing devices.

Figure 3:
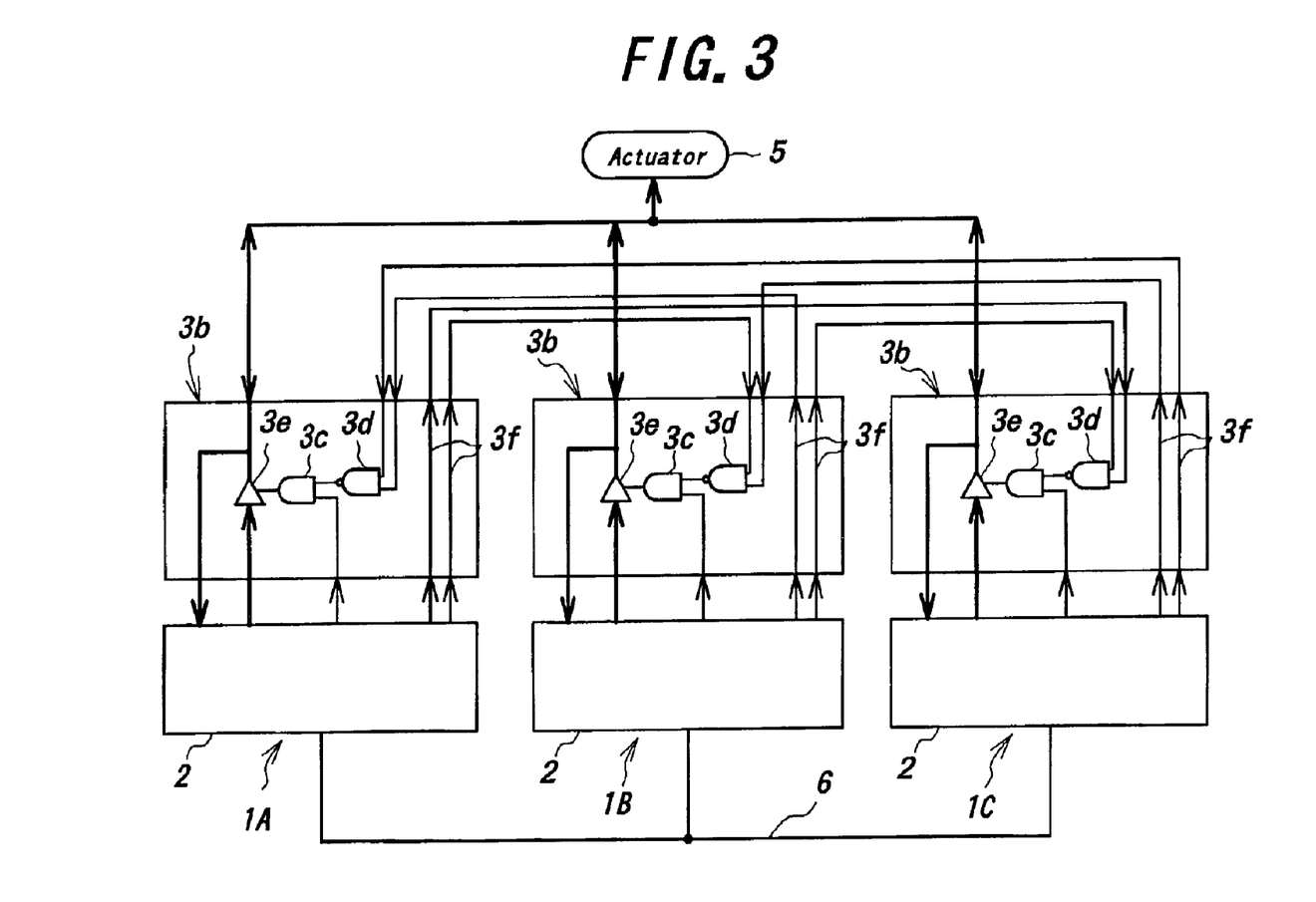
FIG. 3 is a structural view showing the state of interconnection among processor parts and among interface circuits of three processing devices, and between processor part and interface circuit of each processing device.

FIG. 3 is a structural view showing the state of interconnection among the processor parts 2 of the processing devices 1A to 1C and among the interface circuits 3b, and between the processor part 2 and the interface circuit 3b of each of the processing devices 1A to 1C. In this embodiment, by connecting as shown in the figure, the signal circuit 3f of the processor part 2 in each of the processing devices 1A to 1C outputs the blocking signals S1, S2 to the interface circuits 3b of the two other processing devices.

According to the information processing system of this embodiment, when the identical signal is output from the sensor 4 as the common signal output means to the three processing devices 1A to 1C, the CPUs 2a of the processor parts in the three processing devices 1A to 1C first perform in parallel predetermined computing processing based on the signal from the sensor 4 in accordance with a given program in the memories 2b of the processor parts 2. Then the CPUs generate command signals to control the operation of the actuator 5 that is the common object of control, and inputs the result of the information processing performed by the other processing devices among the three processing devices 1A to 1C through the network 6 in order to perform the following majority decision processing.

The result of information processing to be input includes a predetermined part (first several bits, for example) of the generated command signal. Instead of the command signal, it is possible to apply the running amount of the actuator or all or predetermined part of the computing result in the process of generating the command signal. Moreover, in this embodiment, the three processing devices 1A to 1C are previously prioritized; the processing device 1A with the highest priority, the processing device 1B with the next highest priority and the processing device 1C with the lowest priority. In the case where the results of the information processing among the processing devices 1A to 1C do not correspond at all, it has been set to output the command signal of the processing device 1A that has the highest priority.

Figure 4:
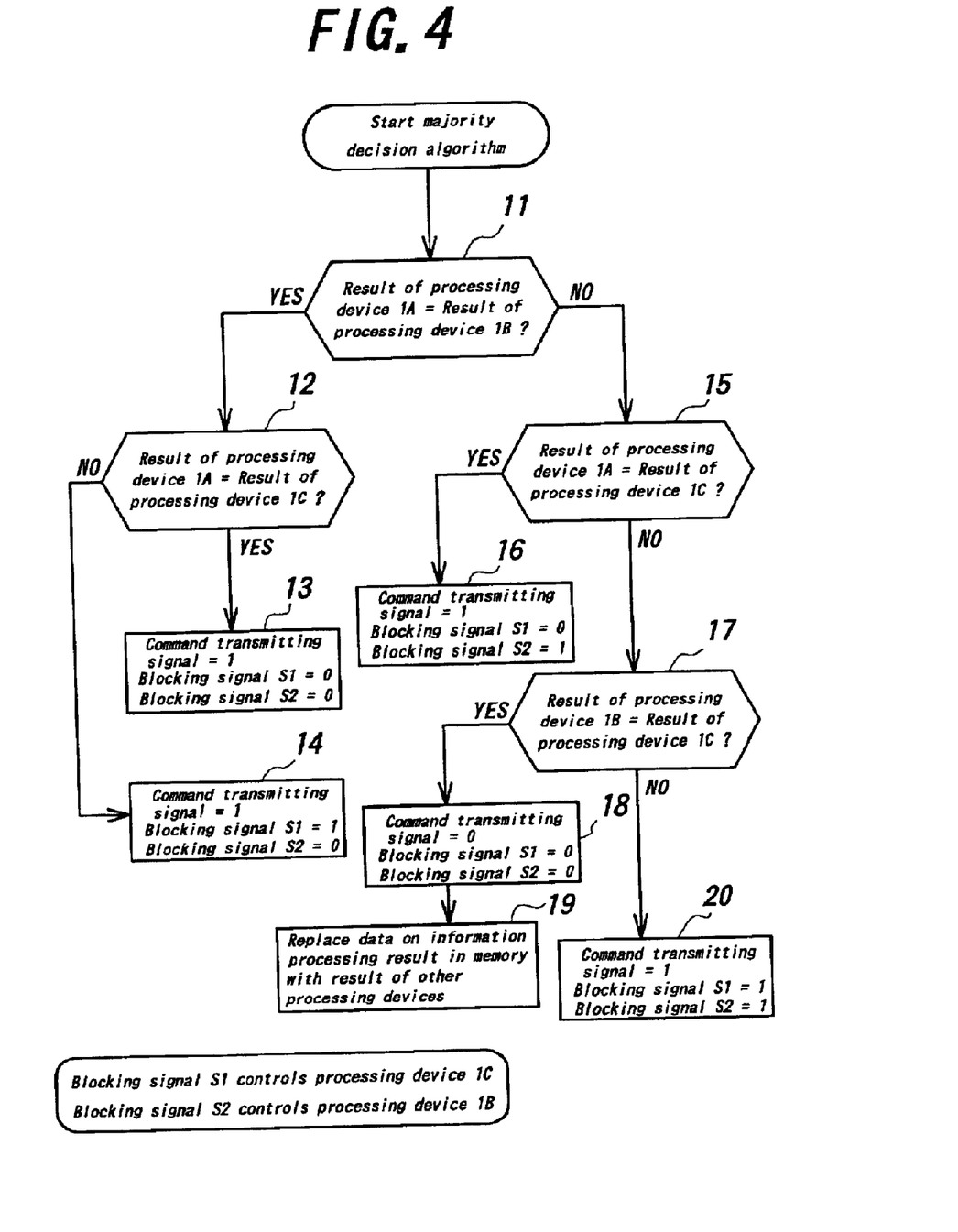
FIG. 4 is a flowchart showing majority decision algorithm as one example of a logical decision performed according to a program in a memory of the processor part by a CPU of a processor part in a processing device 1A in the redundant information processing system in the above embodiment.

FIG. 4 is a flowchart showing the majority decision algorithm as one example of the logical decision performed by the CPU 2a of the processor part 2 on the processing device 1A according to a program in the memory 2b of the processor part 2. Here, the blocking signal S1 is output to the interface circuit 3b of the processing device 1C to control the processing device 1C, and the blocking signal S2 is output to the interface circuit 3b of the processing device 1B to control the processing device 1B.

Step 11 in FIG. 4 comprises comparing the result of the information processing by the CPU 2a of the processing device 1A itself with that by the processing device 1B that is one of the other processing devices and judging the correspondence between the two. When they correspond, step 12 follows. When not correspond, step 15 follows. Next, step 12 comprises comparing the result of the information processing by the CPU 2a of the processing device 1A itself with that by the processing device 1C that is the other one of the other processing devices and judging the correspondence between the two. When they correspond, step 13 follows. When not correspond (This includes the case where the result is not input because of the breakdown of the processing device 1C. The following case where two do not correspond includes the case the result is not input because of the breakdown of one of the processing devices), step 14 follows. Since all the results of the information processing of the three processing devices 1A to 1C correspond according to the judgment made at steps 11 and 12, following step 13 comprises setting the, command transmitting signal for a signal "1" so that the processing device 1A with the highest priority may send the command signal. Step 13 also comprises setting the blocking signals S1 and S2 for signals "0" (no blocking signal) since the other processing devices 1B and 1C are also correct.

On the other hand, step 14 comprises determining that the results of information pressing by the processing devices 1A and 1B are correct according to the logical decision, for example decision by majority, since the results of the processing devices 1A and 1B correspond but those of the processing devices 1A and 1C do not correspond according to the judgment at steps 11 and 12. In this case, step 14 further comprises setting the command transmitting signal for a signal "1" so that the processing device 1A with the highest priority may send the command signal, and also comprises setting the blocking signal S1 directed to the processing device 1C for a signal "1" (blocking signal Yes) since the processing device 1C is incorrect, and setting the blocking signal S2 directed to the processing device 1B for a signal "0" since the processing device 1B is correct.

Furthermore, in the same way as step 12, step 15 comprises comparing the result of the information processing by the CPU 2a of the processing device 1A itself with that by the processing device 1C that is the other one of the other processing devices and judging the correspondence between the two. When they correspond, step 16 follows. When not correspond, step 17 follows. Step 16 comprises determining that the results of information processing by the processing devices 1A and 1C are correct according to the logical decision, for example decision by majority, since the results of the processing devices 1A and 1C correspond but those of the processing devices 1A and 1B do not correspond according to the judgment at steps 11 and 15. In this case, step 16 further comprises setting the command transmitting signal for a signal "1" so that the processing device 1A with the highest priority may send the command signal, and also comprises setting the blocking signal S1 directed to the processing device 1C for a signal "0" since the processing device 1C is correct, and setting the blocking signal S2 directed to the processing device 1B for a signal "1" since the processing device 1B is incorrect.

On the other hand, step 17 further comprises comparing the results of the information processing of the two processing devices 1B and 1C and judging the correspondence between the two. When they correspond, step 18 follows. When not correspond, step 20 follows. Step 18 comprises determining tat the results of information processing by the processing devices 1B and 1C are correct according to the logical decision, for example, decision by majority, since the results of the processing devices 1B and 1C correspond but neither those of the processing devices 1A and 1B nor those of the processing devices 1A and 1C correspond according to the judgment at steps 11, 15 and 17. In this case, step 18 further comprises setting the command transmitting signal for a signal "0" so that the processing device 1B with the highest priority may send the command signal, and also comprises setting the blocking signals S1 and S2 for a signal "0" since the processing devices 1B and 1C are correct. After this, step 19 comprises replacing data on the result of the information processing in the memory 2b of the processor part 2 of the processing device 1A with data on the result of the information processing from the other processing devices 1B and 1C.

When all the results of the information processing of the three processing devices 1A to 1C do not correspond according to the judgment made at the precedent steps 11, 15 and 17, this makes it impossible to determine by the logical decision, for example, majority decision. Therefore, according to the aforementioned rule as to this embodiment, step 20 comprises setting the command transmitting signal for a signal "1" so that the processing device 1A that has the highest priority among the free processing devices may send the command signal, and also setting the blocking signals S1 and S2 for a signal "1" since both the processing devices 1B and 1C are incorrect.

Figure 5:
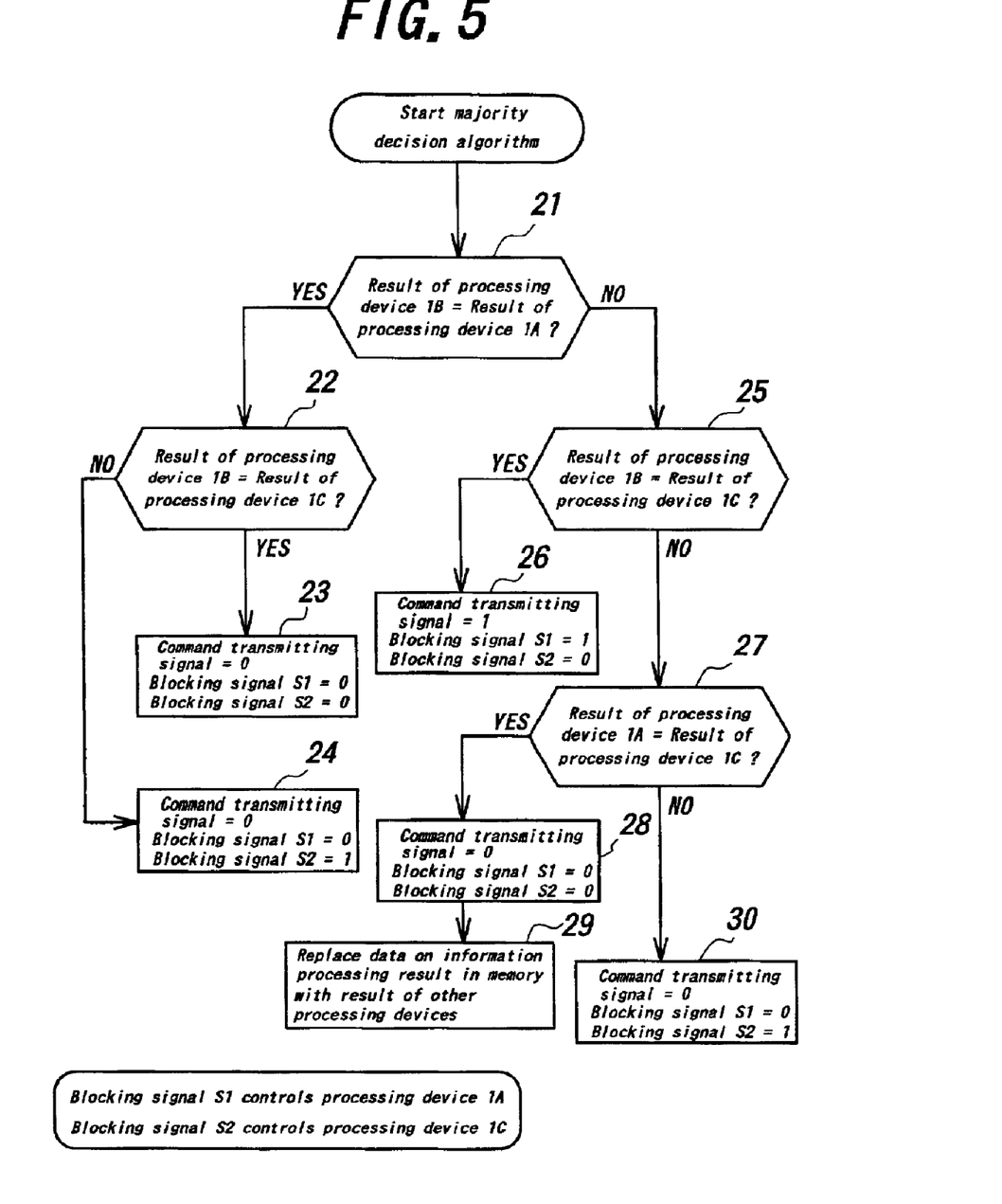
FIG. 5 is a flowchart showing majority decision algorithm as one example of a logical decision performed according to a program in a memory of the processor part by a CPU of a processor part in a processing device 1B in the redundant information processing system in the above embodiment.

FIG. 5 is a flowchart showing the majority decision algorithm as one example of a logical decision performed by the CPU 2a of the processor part 2 of the processing device 1 according to a program in the memory 2b of the processor part 2. Here, the blocking signal S1 is output to the interface circuit 3b of the processing device 1A to control the processing device 1A, and the blocking signal S2 is output to the interface circuit 3b of the processing device 1C to control the processing device 1C.

Step 21 in FIG. 5 comprises comparing the result of the information processing by the CPU 2a of the processing device 1B itself with that by the processing device 1A that is one of the other processing devices and judging the correspondence between the two. When they correspond, step 22 follows. When not correspond, step 25 follows. Next, step 22 comprises comparing the result of the information processing by the CPU 2a of the processing device 1B itself with that by the processing device 1C that is the other one of the other processing devices and judging the correspondence between the two. When they correspond, step 23 follows. When not correspond, step 24 follows. Since all the results of the information processing of the three processing devices 1A to 1C correspond according to the judgment made at steps 21 and 22, following step 23 comprises setting the command transmitting signal for a signal "0" so that the other processing device 1A with the highest priority can send the command signal. Step 23 also comprises setting the blocking signals S1 and S2 for a signal "0" (no blocking signal) since the other processing devices 1A and 1C are also correct.

On the other hand, step 24 comprises determining that the results of information processing by the processing devices 1A and 1B are correct according to the logical decision, for example decision by majority, since the results of the processing devices 1A and 1B correspond but those of the processing devices 1D and 1C do not correspond according to the judgment at steps 21 and 22. In this case, step 24 further comprises setting the command transmitting signal for a signal "0" so that the other processing device 1A with the highest priority can send the command signal, and also comprises sag the blocking signal S2 directed to the processing device 1C for a signal "1" (blocking signal Yes) since the processing device 1C is incorrect, and setting the blocking signal S1 directed to the processing device 1A for a signal "0" since the processing device 1A is correct.

Furthermore, in the same way as step 22, step 25 comprises comparing the result of the information processing by the CPU 2a of the processing device 1B itself with that by the processing device 1C tat is the other one of the other processing devices and judging the correspondence between the two. When they correspond, step 26 follows. When not correspond, step 27 follows. Step 26 comprises determining that the results of information processing by the processing devices 1B and 1C are correct according to the logical decision, for example decision by majority, since the results of the processing devices 1B and 1C correspond but those of the processing devices 1A and 1B do not correspond according to the judgment at steps 21 and 25. In this case, step 26 further comprises setting the command transmitting signal for a signal "1" so that the processing device 1B with the highest priority may send the command signal, and also comprises setting the blocking signal S1 directed to the processing device 1A for a signal "1" since the processing device 1A is incorrect, and setting the blocking signal S2 directed to the processing device 1C for a signal "0" since the processing device 1C is correct.

On the other hand, step 27 further comprises comparing the results of the information processing of the two processing devices 1A and 1C and judging the correspondence between the two. When they correspond, step 28 follows. When not correspond, step 30 follows. Step 28 comprises determining that the results of information processing by the processing devices 1A and 1C are correct according to the logical decision, for example, decision by majority, since the results of the processing devices 1A and 1C correspond but neither those of the processing devices 1A and 1B nor those of the processing devices 1B and 1C correspond according to the judgment at steps 21, 25 and 27. In this case, step 28 further comprises setting the command transmitting signal for a signal "0" so that the processing device 1A with the highest priority may send the command signal, and also comprises setting the blocking signals S1 and S2 for a signal "0" since the processing devices 1A and 1C are correct. After this, step 29 comprises replacing data on the result of the information processing in the memory 2b of the processor part 2 of the processing device 1B with data on the result of the information processing from the other processing devices 1A and 1C.

When all the results of the information processing of the he processing devices 1A to 1C do not correspond according to the judgment made at precedent steps 21, 25 and 27, this makes it impossible to determine by the logical decision, for example, majority decision. Therefore, according to the aforementioned rule as to this embodiment, step 30 comprises setting the command transmitting signal for a signal "0" and setting the blocking signal S1 directed to the processing device 1A for a signal "0" so that the processing device 1A that has the highest priority among the three processing devices can send the command signal, and also setting the blocking signal S2 directed to the processing device 1C for a signal "1" since the processing device 1C is incorrect.

Figure 6:
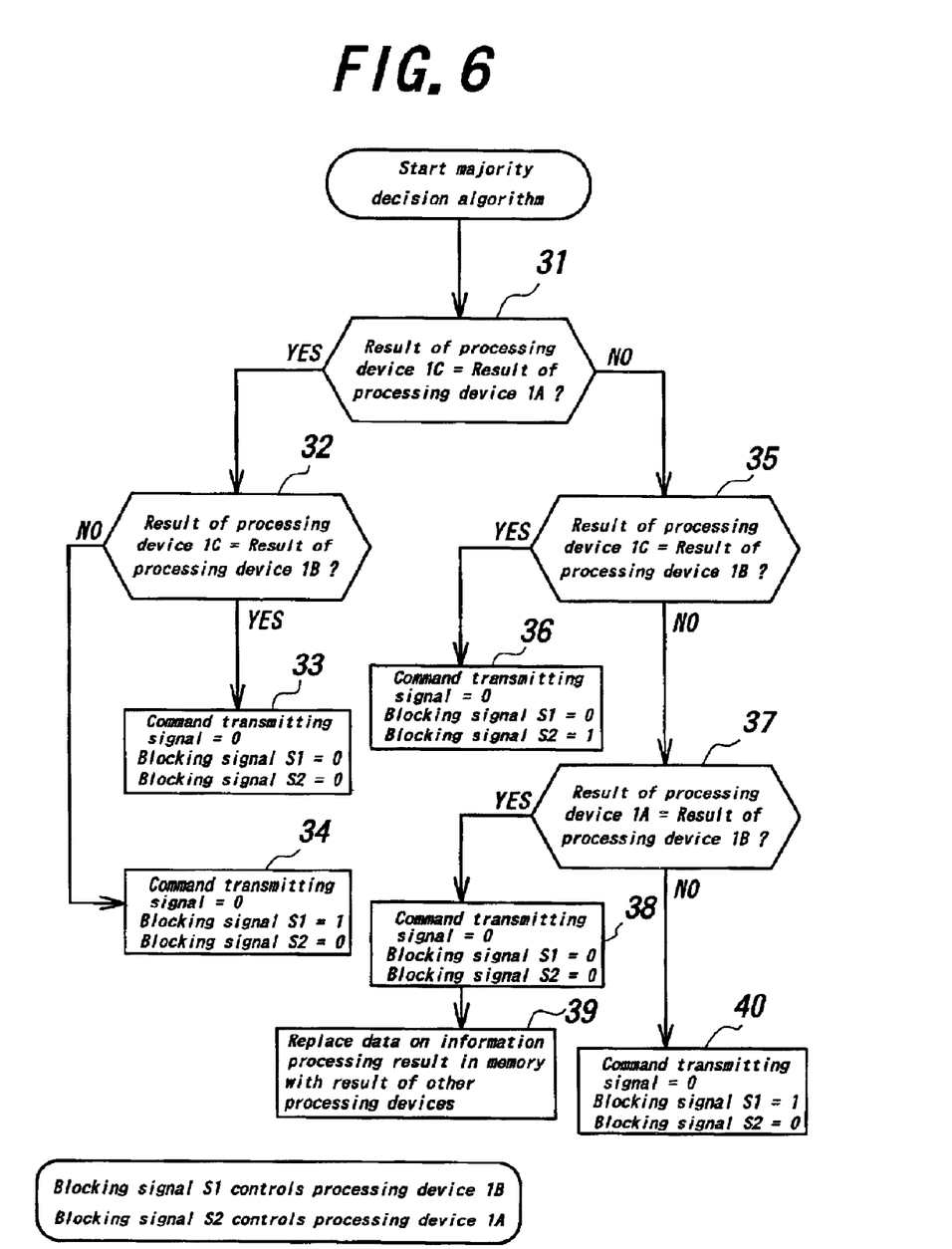
FIG. 6 is a flowchart showing majority decision algorithm as one example of a logical decision performed according to a program in a memory of the processor part by a CPU of a processor part in a processing device 1C in the redundant information processing system in the above embodiment.

FIG. 6 is a flowchart showing the majority decision algorithm as one example of a logical decision performed by the CPU 2a of the processor part 2 of the processing device 1C according to a program in the memory 2b of the processor part 2. Here, the blocking signal S1 is output to the interface circuit 3b of the processing device 1B to control the processing device 1B, and the blocking signal S2 is output to the interface circuit 3b of the processing device 1A to control the processing device 1A.

Step 31 in FIG. 6 comprises comparing the result of the information processing by the CPU 2a of the processing device 1C itself with that by the processing device 1A that is one of the other processing devices and judging the correspondence between the two. When they correspond, step 32 follows. When not correspond, step 35 follows. Next, step 32 comprises comparing the result of the information processing by the CPU 2a of the processing device 1C itself with that by the processing device 1B that is the other one of the other processing devices and judging the correspondence between the two. When they correspond, step 33 follows. When not correspond, step 34 follows. Since all the results of the information processing of the three processing devices 1A to 1C correspond according to the judgment made at steps 31 and 32, following step 33 comprises setting the command transmitting signal for a signal "0" so that the other processing device 1A with the highest priority can send the command signal. Step 33 also comprises setting the blocking signals S1 and S2 for a signal "0" (no blocking signal) since the other processing devices 1A and 1C are also correct.

On the other hand, step 34 comprises determining that the results of information processing by the processing devices 1A and 1C are correct according to the logical decision, for example decision by majority, since the results of the processing devices 1A and 1C correspond but those of the processing devices 1B and 1C do not correspond according to the judgment at steps 31 and 32. In this case, step 34 further comprises setting the command transmitting signal for a signal "0" so that the other processing device 1A with the highest priority can send the command signal, and also comprises setting the blocking signal S1 directed to the processing device 1B for a signal "1" (blocking signal Yes) since the processing device 1B is incorrect, and setting the blocking signal S2 directed to the processing device 1A for a signal "0" since the processing device 1A is correct.

Furthermore, in the same way as step 32, step 35 comprises comparing the result of the information processing by the CPU 2*a* of the processing device 1C itself with that by the processing device 1B that is the other one of the other processing devices and judging the correspondence between the two. When they correspond, step 36 follows. When not, step 37 follows. Step 36 comprises determining that the results of information processing by the processing devices 1B and 1C are correct according to the logical decision, for example decision by majority, since the results of the processing devices 1B and 1C correspond but those of the processing devices 1A and 1C do not correspond according to the judgment at steps 31 and 35. In this case, step 36 further comprises setting the command transmitting signal for a signal "0" so that the other processing device 1B with the highest priority can send the command signal, and also comprises setting the blocking signal S1 directed to the processing device 1B for a signal "0" since the processing device 1B is correct, and setting the blocking signal S2 directed to the processing device 1A for a signal "1" since the processing device 1A is incorrect.

On the other hand, step 37 further comprises comparing the results of the information processing of the two processing devices 1A and 1B and judging the correspondence between the two. When they correspond, step 38 follows. When not correspond, step 40 follows. Step 38 comprises determining that the results of information processing by the processing devices 1A and 1B are correct according to the logical decision, for example, decision by majority, since the results of the processing devices 1A and 1D correspond but neither those of the processing devices 1A and 1C nor those of the processing devices 1B and 1C correspond according to the judgment at steps 31, 35 and 37. In this case, step 38 further comprises setting the command transmitting signal for a signal "0" so that the processing device 1A with the highest priority can send the command signal, and also comprises setting the blocking signals S1 and S2 for signals "0" since the processing devices 1A and 1B are correct. After this, step 39 comprises replacing data on the result of the information processing in the memory 2*b* of the processor part 2 of the processing device 1C with data on the result of the information processing from the other processing devices 1A and 1B.

When all the results of the information processing of the tree processing devices 1A to 1C do not correspond according to the judgment made at precedent steps 31, 35 and 37, this makes it impossible to determine by the logical decision, for example, majority decision. Therefore, according to the aforementioned rule as to this embodiment, step 40 comprises setting the command transmitting signal for a signal "0" and setting the blocking signal S2 directed to the processing device 1A for a signal "0" so that the processing device 1A that has the highest priority among the three processing devices can send the command signal, and also setting the blocking signal S1 directed to the processing device 1B for a signal "1" since the processing device 1B is incorrect.

In this way, according to the foregoing embodiment, the processor parts 2 of the processing devices 1A to 1C perform parallel processing. When the processor part 2 judge itself to be correct and be allowed to transmit a command transmitting signal according to the logical decision, for example, majority decision and priority, it outputs a signal "1" as the command transmitting signal to the interface circuit 3*b* of the processing device. When the processor part 2 judges the result of information processing of the other processing device to be incorrect, it transmits a blocking signal to the interface 3*b* of that processing device except when being unable to judge by the logical decision, for example, the majority decision. As a result, as shown in the diagram 1 below, when the processing devices 1A to 1C correspond, when only the processing devices 1A and 1B correspond and when only the processing devices 1A and 1C correspond, the processing device 1A outputs a command signal to the actuator 5 via the interface 3*b*. When only the processing devices 1B and 1C correspond, the processing device 1D outputs a command signal to the actuator 5 via the interface 3*b*. When all the processing devices 1A to 1C do not correspond, following an operational demand, that is, the processing device with the highest priority is required to output a command signal, the processing device 1A outputs the command signal to the actuator 5. Moreover, when all the processing devices 1A to 1C do not correspond, it is also possible to make an operational demand not to allow any of the processing devices to output commands and to send an error warning signal to the user of the system.

[diagram 1]

| Processing device 1A | Processing device 1B | Processing device 1C | Processing device to output command |
|---|---|---|---|
| ○ | ○ | ○ | Processing device 1A |
| ○ | ○ | ● | Processing device 1A |
| ○ | ● | ○ | Processing device 1A |
| ● | ○ | ○ | Processing device 1B |
| ● | ● | ● | For operational demand |

The blank mark (○) indicates the processing device of which the result of information processing corresponds.

Figure 7:
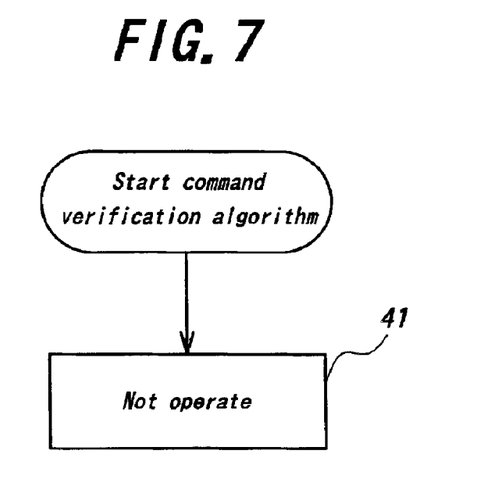
FIG. 7 is a flowchart showing command verification algorithm performed by the processor part of the processing device 1A in the redundant information processing system in the above embodiment.
Figure 8:
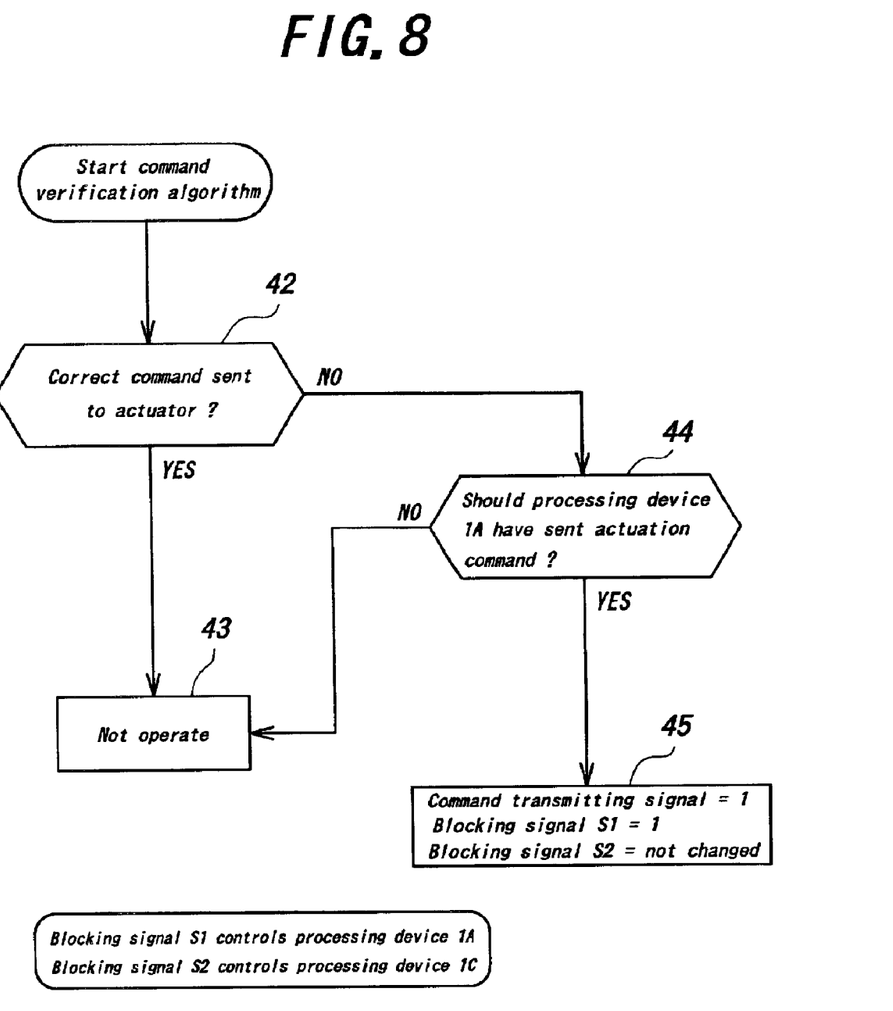
FIG. 8 is a flowchart showing command verification algorithm performed by the processor part of the processing device 1B in the redundant information processing system in the above embodiment.
Figure 9:
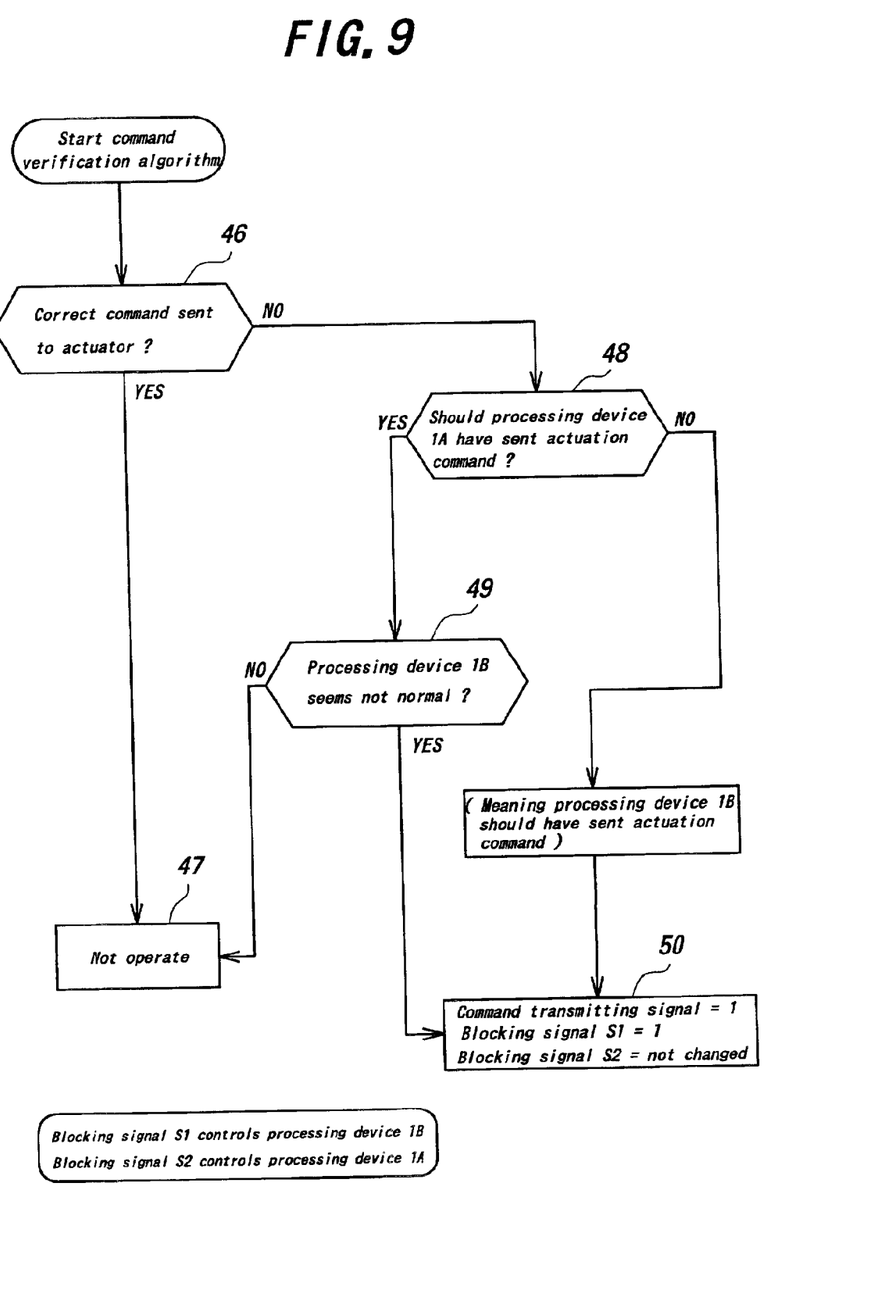
FIG. 9 is a flowchart showing command verification algorithm performed by the processor part of the processing device 1C in the redundant information processing system in the above embodiment.

In the information processing system according to this embodiment, following command verification algorithm is executed. This computing processing handles the case where a command signal is not properly output because of the abnormality in the interface circuits 3 while proper information processing is performed in the processor parts 2. FIGS. 7 to 9 are flowcharts showing the command verification algorithm which the processor parts 2 of the processing devices 1A to 1C execute.

As shown in step 41 of FIG. 7, the processor part 2 of the processing device 1A with the highest priority does not operate. As shown in FIG. 8, at step 42, the processor part 2 of the processing device 1B with the next highest priority judges whether a correct command signal is sent from any of the interface circuits 3 to the actuator 5 based on, for example, a first part of the command signal sent back as a command verification signal from a circuit connected to the actuator. When a correct command signal is sent, step 43 follows and no operation is made. When a correct command signal is not sent, the processor part 2 judges whether the processing device 1A should have sent an actuation command signal to the actuator 5 at step 44. In the case where the processing devices other than the processing device 1A should have sent the actuation command signal, step 43 follows. In the case where the processing device 1A should have sent the actuation command signal, the processor part 2 sets a command transmitting signal for a signal "1" for the processing device 1B to send a command signal, and sets the blocking signal S1 directed to the processing device 1A for a signal "1" and keeps state of the blocking signal S2 directed to the processing device 1C as it is at step 45.

Furthermore, as shown in FIG. 9, at step 46, the processor part 2 of the processing device 1C with the lowest priority judges whether a correct command signal is sent from any of the interface circuits 3 to the actuator 5 based on, for example, a first part of the command signal sent back as a command verification signal from the circuit connected to the actuator. When a correct command signal is sent, step 47 follows and no operation is made. When a correct command signal is not sent, the processor part 2 judges whether the pressing device 1A should have sent an actuation command signal to the actuator 5 at step 48. In the case where the processing device 1A should have sent the actuation command signal, the processor part 2 judges whether the processing device 1B is normal at step 49.

At step 49, when the processor part 2 judges that the processing device 1B is normal, it makes no operation and when judges that the processing device 1B is not normal, it proceeds to step 50. Also when other than the processing device 1A, which is the processing device 1B should have sent a command signal at the step 48, it also proceeds to the step 50. At the step 50, a command transmitting signal is set for a signal "1" such that the processing device 1C sends a command signal, and the blocking signal S1 directed to the processing device 1B is set for a signal "1", and the state of the blocking signal S2 directed to the processing device 1A is kept as it is.

According to the command verification algorithm, when a command signal is not at all sent or an incorrect command signal is sent because of the abnormality in the interface circuit 3 of the processing device 1A which should send a command signal, of the processing devices 1A and 1B whose processor parts 2 are normal, the processing device 1B immediately blocks the output of the command signal of the processing device 1A and sends a correct command signal so that the operation of the actuator 5 is properly controlled. Moreover, when the processing device 1A can not output a command signal because of the abnormality in the interface circuit 3 of the processing device 1A, while a command signal is not at all sent or an incorrect command signal is sent because of the abnormality in the interface circuit 3 of the processing device 1B, the processing device 1C immediately blocks the output of the command signal of the processing device 1B and sends a correct command signal so that the operation of the actuator 5 is properly controlled.

According to the information processing system of this embodiment, even though there is abnormality in the result of the information processing in several, which is below the majority, of tree processing devices 1A to 1C that comprise the system, control information generated by the two or more processing devices is made valid according to the logical decision, for example, the majority decision. This makes it possible to select the control information that has been generated normally and to obtain the control information with higher reliability.

Moreover, according to the information processing system of this embodiment, a command signal can be sent from a single processing device only with the higher priority out of the two or more processing devices with valid command signals, that is, the processing devices that are highly likely to operate normally, to the object of control. This can prevent the difficulty in operating the actuator 5 due to the overlapping or striking of plural command signals.

Moreover, according to the information processing system of this embodiment, the information processing for generating a command signal based on the signal from the sensor 4; logical decision, for example, the majority decision processing for making the command signal valid; selecting processing of command signal from a plurality of processing devices made valid by the logical decision; all are performed in the three processing devices 1A to 1C. This frees from parts that could become a single fault point such as the majority decision logic circuit and its control circuit in the system. It is thereby possible to constitute a system with sufficient reliability at a moderate cost.

Furthermore, according to the information processing system of this embodiment, the above described processing can be performed regardless of the number of the processing devices as long as the number is not reduced. This provides high extendibility so that the number of processing devices can be increased in accordance with the demand for reliance whereby the demand can easily be met.

Still further, according to the information processing system of this embodiment, the interface circuits 3 are constituted by logical computing elements and comprised of a combination circuit without feedback loop and has no storage element, possibility of a Single Event Upset (SEU) where the storage element is inverted by the influence of cosmic radiation or the like can be eliminated as to the logical computing part, when applied to the attitude control of a rocket or an artificial satellite in space. It is thereby possible to effectively prevent the result determined by the processor parts 2 according to the logical decision, for example, majority decision from being in vain because of the malfunction of the logical computing part caused by the SEU.

Further yet, according to the information processing system of this embodiment, in the case where the processing devices 1A to 1C use past control information in the process of generating the command signal, the processing device other than the processing devices with the valid command signals abandons the generated command signal and replaces it with a command signal of the processing device with the valid command signal at the precedent steps 19, 29 and 39. This can prevent temporary errors such as an inversion error of the storage element caused by such as radiation from further continuing, thereby resulting in the improvement of the reliability of the system.

Further yet, according to the information processing system of this embodiment, as shown in FIGS. 4 to 6, the processing procedures of the logical decision, for example, the majority decision made by the processor parts 2 of the three processing devices 1A to 1C are the same. This can reduce the operational errors made by the operator when developing programs for performing the logical decision or installing the programs in the system, thereby resulting in the improvement of the reliability of the system.

The description has been given according to the embodiment. However, the present invention is not limited to the foregoing embodiment. For example, the number of processing devices can be suitably chosen with three or more devices which can adopt, for example, the majority decision (that is, it is possible to select the result of information processing of the greater number of processing devices whose results of information processing are the same). In the case where the number is four, for example, when the results of information processing of two processing devices correspond, those processing devices are correct. And when each two of the processing devices has the same result information processing respectively, the processing devices for outputting the control information can be decided based on the priority. Further, the signal output means is not limited to the sensor 4, and the object of control is not limited to the actuator 5 either.

The preferred embodiments described herein are therefore illustrative and not restrictive, the scope of the invention being indicated by the appended claims and all variations which come within the meaning of the claims are intended to be embraced therein.

What is claimed is:

1. A redundant information processing system in which each of three or more processing devices performs predetermined information processing based on a signal from common signal output means to generate control information, and from pieces of the control information, control information is decided by a logical decision to control a common control object, each of said three or more processing devices comprising:

a transmission permitting part which is adapted to collect the results of information processing in the process of generating said control information by said three or more processing devices, and to decide by the logical decision that the control information generated by which processing device is valid; in the case where control information generated by said two or more processing devices including said relevant processing device among said three or more processing devices are valid, said transmission permitting part being adapted to output a control information transmitting signal when said valid processing device has the highest priority among the processing devices with the valid control information according to predetermined priorities or not to output the control information transmitting signal when said valid processing device does not have the highest priority, while outputting a control information blocking signal to each of the processing devices other than the processing devices with the valid control information; and in the case where the control information generated by the other processing devices except said relevant processing device among said three or more processing devices is valid, said transmission permitting part being adapted not to output the control information transmitting signal and not to output the control information blocking signal to the other processing devices, wherein each of said three or more processing devices further comprises a logical computing part which is adapted to input said control information blocking signal from the other processing devices except said relevant processing device among three or more processing devices; and in the case where the number of inputs of the control information blocking signal is less than a predetermined number made valid by said logical decision and said transmission permitting part of said processing device outputs said control information transmitting signal, said logical computing part being adapted to output the control information generated by said processing device to said control object; and in the case where the number of inputs of said control information blocking signal is more than said predetermined number, said logical computing part being adapted not to output control information generated by said processing device to said control object even if said transmission permitting part of said processing device outputs said control information transmitting signal.

2. The redundant information processing system according to claim 1 wherein said logical computing part is comprised of logical computing elements and is constituted by a combination circuit without feedback loop.

3. The redundant information processing system according to claim 2 wherein, in the case where said processing device uses past control information in the process of generating said control information, said processing device other than processing devices with valid control information rewrites the generated control information to control information of the processing device with valid control information, and uses the rewritten control information for the next process of generating control information.

4. The redundant information processing system according to claim 2 wherein the processing procedures of the logical decision made by said transmission permitting parts of said three or more processing devices are common to one another.

5. The redundant information processing system according to claim 1 wherein, in the case where said processing device uses past control information in the process of generating said control information, said processing device other than processing devices with valid control information rewrites the generated control information to control information of the processing device with valid control information, and uses the rewritten control information for the next process of generating control information.

6. The redundant information processing system according to claim 5 wherein the processing procedures of the logical decision made by said transmission permitting parts of said three or more processing devices are common to one another.

7. The redundant information processing system according to claim 1 wherein the processing procedures of the logical decision made by said transmission permitting parts of said three or more processing devices are common to one another.

* * * * *